Dec. 13, 1949 L. E. W. MONTROSE-OSTER 2,491,012
CONTROL ARRANGEMENT FOR AUTOMOBILES
Filed May 24, 1946 2 Sheets-Sheet 2
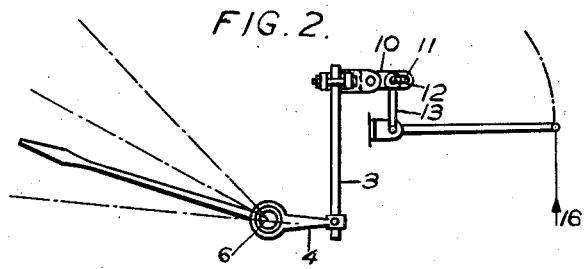
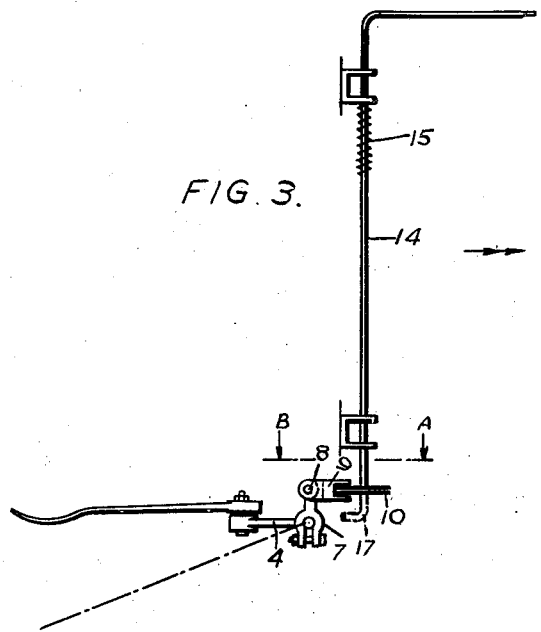
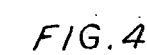
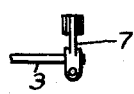
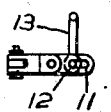
Inventor
Louis E.W. Montrose-Oster
By: Emery, Holcombe & Blair
Attorneys Patented Dec. 13, 1949

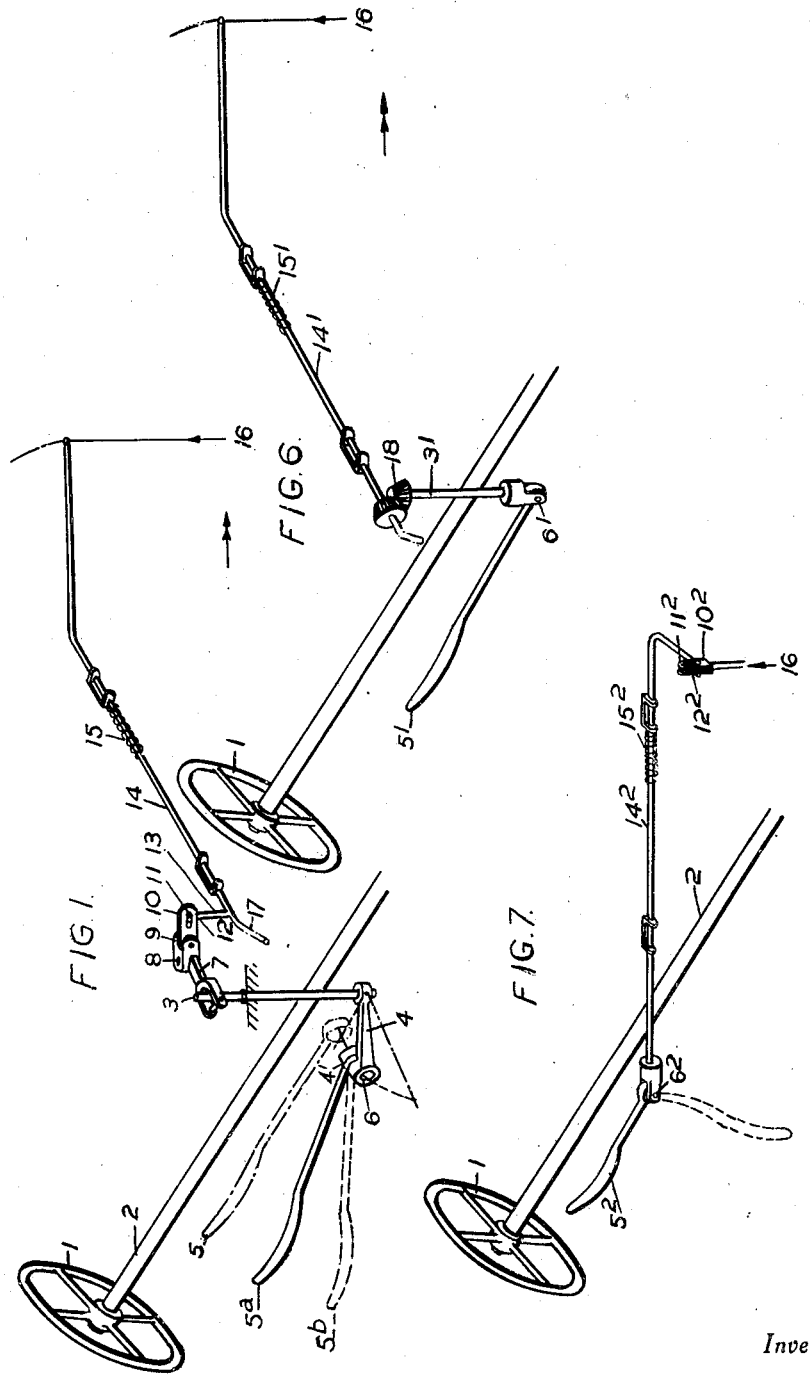

2,491,012

UNITED STATES PATENT OFFICE 2,491,012

CONTROL ARRANGEMENT FOR AUTOMOBILES

Louis Eugene Widolt Montrose-Oster, Brussels, Belgium, assignor of one-half to Pollopas Patents Limited, London, England, a British company Application May 24, 1946, Serial No. 672,054
In Germany October 14, 1941

3 Claims. (Cl. 74—515)

Although a few vehicles may be provided with automatic or semi-automatic accelerators or else with hand accelerators, the majority of all automobiles are fitted with foot accelerators, that is to say, accelerators in the form of a pedal located on the right hand side of the brake and clutch pedals.

This usual arrangement nevertheless presents serious drawbacks, as follows:

(1) The same foot (right) being called upon to operate both the accelerator and the brake, whilst, during running, remaining constantly on the accelerator, several precious instants are lost when, in case of urgent danger, said foot must release the accelerator and then find and press down the brake pedal.

(2) As the whole body, and the legs in particular, generally become stiff under the effect of a sudden fright, it frequently happens that the driver instead of releasing the accelerator presses it down still further, thereby precipitating the vehicle against the obstacle instead of stopping it.

(3) When it is necessary to start on a gradient, one ought to be able to press on the brake and the accelerator at the same time, which is, in practice, impossible.

(4) Running over smaller obstacles which decelerate the vehicle but not the driver, often causes pressure on the accelerator at a moment when the opposite movement should be made.

(5) It is extremely fatiguing to keep the foot motionless on the pedal, especialy when long distances are covered at a uniform speed.

This invention solves the problem by providing an accelerator control which is operated by the leg, that is to say, by the knee, calf or ankle, and which has a construction which is simple, safe, robust, practical and compact, whilst allowing the usual accelerator foot pedal to be optionally retained.

The space occupied is extremely reduced. It is of special importance to provide for the possibility, especially during the transition period, of operating the accelerator both with the new leg lever control and with the usual foot pedal. It is therefore advisable to make the pedal removable.

The leg-operated acceleration lever actuates the carburettor in any convenient manner, preferably by lever arms, bevel gears or ball joints. A feature of the invention consists in the fact that the acceleration lever can be adjusted, in a vertical plane, to any part of the leg from knee to ankle inclusive, preferably by means of a friction device and without interfering with the running of the engine. The latter depends exclusively upon the push exerted by the driver's leg as a function of its lateral movement.

In order that the invention may be more clearly understood, various embodiments thereof will now be described, by way of example, with reference to the accompanying drawings, in which—

Figure 1 shows a perspective view of a complete arrangement adapted to be fitted to an existing vehicle with right-hand drive.

Figure 2 shows the same device in elevation.

Figure 3 is a plan view.

Figure 4 is a partial view in elevation (looking in the running direction) of the vertical spindle and the parts attached to it.

Figure 5 is a view in elevation (looking from the left hand side of the vehicle towards its right hand side) of the section along A—B in Fig. 3.

Figures 6 and 7 illustrate simplified modifications applicable when it is not proposed to adapt the device to an existing vehicle but to incorporate it in a new type of vehicle.

In the drawings the forward running direction of the vehicle is indicated by a double arrow. Referring to the embodiment shown in Figs. 1 to 5, 1 represents the steering wheel and 2 the steering column. Passing through the partition separating the engine from the driver is a vertical spindle 3 located to the right of the steering column. Fixed to the lower end of this spindle is a horizontal lever 4 which carries at its other end a lever 5 capable of pivoting in a vertical plane around a spindle 6. A friction device 4' interposed between 4 and 5 holds the lever 5 at any adjusted angle with reference to the horizontal.

At its other end, the spindle 3 is provided with a lever 7 displaced 90 degrees relatively to the lever 4 and provided at its other end with a vertical spindle 8 around which a jointed lever 9—10 is pivotable, the latter being provided with a slot 11 at its free end extending in the running direction. This slot is engaged by the horizontal part 12 of a T member, the vertical portion 13 of which is integral with the rod 14 which works against the action of a return spring 15, whilst the carburettor occupies for instance, the position indicated by the arrow 16.

The end 17 shown in dot and dash lines of the rod 14 indicates a portion of the lever provided with a head which normally constitutes the pedal for operating the accelerator.

In the position of rest of the accelerator, the spindle 3 and the levers 4 and 5 are in vertical planes parallel to the vertical plane passing through the steering column 2. In the transverse direction, the lever 5 is in the same plane as the steering column which it may even touch to the extent of merging into it. The space occupied by the apparatus is therefore practically nil. In this position of the lever 5, the pin 12 of the T member 12—13 is at the left hand end of the slot 11.

Before starting, the driver moves the lever 5 laterally away from the steering column 2 up to the point where he feels resistance of the return spring 15. The lever 5 is then, for instance, in the position 5a, and the pin 12 of the T member 12—13 is then at the right hand end of the slot 11, as shown in Figure 1. This preliminary lateral displacement of the lever 5 enables the driver's right leg to be interposed between the steering column 2 and the lever 5, and owing to the lost-motion provided by the pin-and-slot connection 12, 11, this displacement is accomplished without actuating the rod 14. For the driver's convenience, the lever 5 may also be adjustably raised or lowered by a simple pressure of the hand, which causes it to perform a slight angular movement around the spindle 6 without interfering in any way with the position of the spindle 3 and the adjustment of the carburettor. The friction device interposed between the levers 4 and 5 holds the lever 5 in any position in the vertical plane to which it has been adjusted by the driver. It may therefore rest, as required, against, for example, the knee (position 5a) or against the calf (position 5b) at the height most convenient for the driver.

When it is desired to accelerate, a slight outward displacement of the right leg causes the whole system 5—6—4—3—7—8 to pivot around an axis passing through 3 and causes the jointed lever 9—10 and the pin 12 of T member 12—13, to move backwards. The lever 13 causes the rod 14 to perform an angular movement in an anti-clockwise direction and operates the carburettor controls in the direction of the arrow 16 in opposition to the action of the return spring 15.

As has been proved, a vehicle provided with the accelerator arrangement described can be driven for hours with precision and without the slightest fatigue.

It will be observed that the upper part or free end of the lever 5 is slightly incurved and flattened in order to make it fit comfortably to the round shape of the leg.

The embodiment described by way of example refers to an accelerator actuated by the right leg in a vehicle with right hand drive. It is quite as easy to adapt the same arrangement for a vehicle with left hand drive, or to have it controlled by the left leg, or again to locate it at one side of the steering wheel and make it operable by the knee at the other side of the steering wheel. It is preferable, however, to accelerate by moving the leg away in preference to straightening it.

In certain cases the device can be further simplified, for instance by arranging the pivot 6 in the spindle 3, which dispenses with the lever 4. Also, if care be taken to provide for a few degrees of lost motion, the spindle 3 can be arranged to drive the rod 14 directly, either by means of a ball joint or by means of bevel gears. Figure 6 (in which like parts to those of Figure 1 bear the same reference numerals but with the index "1") shows diagrammatically an embodiment simplified in these respects, the pivot $6^1$ of the accelerator lever $5^1$ being arranged in the spindle $3^1$ which drives the rod $14^1$ directly through bevel gearing 18.

Figure 7 (wherein corresponding parts to those in the previous embodiments bear the same reference numerals but with the index "2") illustrates an arrangement in acordance with the invention which can be used when the carburettor is arranged on the same side as the steering wheel. In such case the pivot $6^2$ of the control lever $5^2$ is arranged in the rear end of the horizontal rod $14^2$ of the device, which rod is in a vertical plane very near to that of the steering column 2. The accelerator lever $5^2$ is likewise in the same plane, when at rest, and may extend from its pivot $6^2$ upwardly as shown in full lines in the example, or downwardly at 180° with respect to the full-line position shown, according to which of these rest positions is appropriate in a particular installation. The lever $5^2$ is accordingly turned from its position of rest downwardly or upwardly as the case may be and from front to rear to the position indicated in broken lines, when the driver wants to use it. The lost motion provided to allow the preliminary lateral adjustment of the lever $5^2$ without affecting the carburettor, may be provided, as desired, either at the junction of the control lever $5^2$ and the longitudinal rod $14^2$, or at the point of connection of the latter to the carburettor, for instance, by the provision of a pin and slot connection of the rod $14^2$ with the carburettor. Illustratively, Figure 7 shows an example of the last-mentioned arrangement in which the rod $14^2$ terminates in a pin $12^2$ which engages the slot $11^2$ in the end of a lever $10^2$ connected with the carburettor. The modification of Figure 7 represents a simplified embodiment in so far as, if it is desired to provide a pedal, the combination of the two systems can be effected with the aid of only a few additional members.

From the foregoing it will thus be seen that the several disadvantages hereinbefore referred to of foot pedal accelerators have been successfully overcome or avoided in a practical manner by the leg operated accelerator control provided by this invention, and that there has been provided a simple and practical accelerator control incorporating an accelerator lever for leg actuation which is extremely compact and capable of being parked close to or against the steering column so as to offer no obstruction to the driver getting into and out of his seat, while being readily shiftable from the parked position into a conveniently placed and adjustable position ready for use by the driver, such movements of the lever between parking and operative positions being accomplished without interference with the carburettor setting.

As numerous possible modifications and embodiments may be made of the mechanical features of the invention without departing from the scope thereof, it is to be understood that all matter hereinbefore set forth or shown in the accompanying drawings has been given by way of example only and accordingly is to be interpreted as illustrative and not in a limitative sense. It is also to be understood that the term "leg" as used in this specification and in the appended claims means that part of the human limb from the knee to the ankle inclusive.

I claim:

1. An accelerator control for a carburettor of an automobile engine, comprising the combination of a laterally displaceable control member adapted for actuation by lateral leg pressure, and transmission means for transmitting lateral motion of said control member to said carburettor for regulating the carburettor gas supply, said transmission means including a lost-motion coupling comprising a coupling element operatively connected with said control member, a second coupling element operatively connected with said carburettor and with an accelerator foot pedal, said coupling elements having a slip connection between them allowing said control member an initial untransmitted lateral displacement before commencing to control said transmission means and also allowing said foot pedal to control said carburettor without moving said control member.

2. An accelerator control for a carburettor of an automobile engine, comprising the combination of an accelerator control lever mounted on a support for pivotal lateral displacement and adapted for actuation by lateral leg pressure, said lever being adjustable relatively to said support in a substantially vertical plane, friction means associated with said lever and said support for retaining said lever in any angularly adjusted position thereof relatively to said support and transmission means coupled to said support for transmitting lateral motion of said control lever to said carburettor for regulating the carburettor's gas supply, said transmission means including a lost-motion coupling comprising a coupling element operatively connected with said support, a second coupling element operatively connected with said carburettor and with an accelerator foot pedal, said coupling elements having a slip connection between them allowing said lever an initial untransmitted lateral displacement before commencing to control said transmission means through said support and also allowing said foot pedal to control said carburettor without moving said lever.

3. An accelerator control for an automobile having a steering column, comprising a control lever pivotally mounted (at one end) on a support member and movable to a parking position in which said lever extends alongside and parallel with said steering column so as to lie out of the way of the driver's legs when entering and leaving the automobile, said lever being pivotable with said support member for displacement to an operative position laterally spaced from said steering column sufficiently to permit of the driver's leg being interposed between said steering column and said lever, whereby said lever, when in its said operative position, is capable of being laterally engaged by the driver's leg, said lever being capable under lateral leg pressure of further lateral pivotal displacement with said support member beyond said operative position for exercising accelerator control, and means coupled with said support member and forming a transmission through which said lever is adapted to exercise accelerator control, said transmission means including a lost-motion coupling comprising a coupling element operatively connected with said support member, a second coupling element operatively connected with said carburettor and with an accelerator foot pedal, said coupling elements having a slip connection between them allowing said lever an initial untransmitted lateral displacement to its said operative position before commencing to control said transmission means and also allowing said foot pedal to control said carburettor without moving said lever, said lever being pivotally adjustable on its said support member in a substantially vertical plane and friction means between said lever and said support member for retaining said lever in any angularly adjusted position thereon relatively to said support member.

LOUIS EUGENE WIDOLT
MONTROSE-OSTER.

REFERENCES CITED

The following references are of record in the file of this patent:

UNITED STATES PATENTS

| Number | Name | Date |
|---|---|---|
| 1,809,021 | Butler | June 9, 1931 |
| 2,221,274 | Taylor | Nov. 12, 1940 |
| 2,224,276 | Salmen | Dec. 10, 1940 |
| 2,288,450 | Hapman | June 30, 1942 |